United States Patent
Araki et al.

(10) Patent No.: US 10,682,939 B2
(45) Date of Patent: Jun. 16, 2020

(54) VEHICLE SEAT

(71) Applicant: TOYOTA BOSHOKU KABUSHIKI KAISHA, Aichi-ken (JP)

(72) Inventors: Toru Araki, Aichi-ken (JP); Koh Tanaka, Aichi-ken (JP); Yoshifumi Watanabe, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 34 days.

(21) Appl. No.: 16/210,875

(22) Filed: Dec. 5, 2018

(65) Prior Publication Data
US 2019/0176668 A1 Jun. 13, 2019

(30) Foreign Application Priority Data
Dec. 8, 2017 (JP) .................................. 2017-235803

(51) Int. Cl.
*B60N 2/70* (2006.01)
*B60N 2/64* (2006.01)
*B60N 2/58* (2006.01)

(52) U.S. Cl.
CPC ............. *B60N 2/70* (2013.01); *B60N 2/5825* (2013.01); *B60N 2/646* (2013.01)

(58) Field of Classification Search
CPC .......... B60N 2/70; B60N 2/2222; B60N 2/68; B60N 2/686; B60N 2/5825; B60N 2205/30
See application file for complete search history.

(56) References Cited

U.S. PATENT DOCUMENTS

| 5,882,073 | A  | * | 3/1999  | Burchi | B29C 44/1257 |
|           |    |   |         |        | 297/218.2    |
| 8,360,530 | B2 | * | 1/2013  | Onoda  | B60N 2/646   |
|           |    |   |         |        | 297/452.21   |
| 9,649,962 | B2 | * | 5/2017  | Line   | B60N 2/929   |
| 9,834,166 | B1 | * | 12/2017 | Line   | B60R 21/207  |
| 9,849,817 | B2 | * | 12/2017 | Line   | B60N 2/62    |

(Continued)

FOREIGN PATENT DOCUMENTS

| JP | 2010-125138   | 6/2010 |
| JP | 2011-016458 A | 1/2011 |

OTHER PUBLICATIONS

German Office Action dated Oct. 24, 2019 in German Application No. 10 2018 220 906.5 with English Translation.

*Primary Examiner* — Shin H Kim
(74) *Attorney, Agent, or Firm* — Greenblum & Bernstein, P.L.C.

(57) ABSTRACT

A vehicle seat including: a pad including: a surface pad on a side of a seating surface; and a back pad integrated to the surface pad; and a cover member that covers the pad, a frame-shaped reinforcing member is insert-molded to an outer peripheral edge of the back pad, a part of the reinforcing member, which is a locked portion that locks an end portion of the cover member, is exposed from the back pad, a part in the outer peripheral edge of the back pad other than a part corresponding to the locked portion is formed with recesses, an engagement member attached to the end portion of the cover member being inserted into the recesses, and the part of the back pad corresponding to the locked portion is thinner than a part of the back pad where the recesses are formed.

5 Claims, 10 Drawing Sheets

(56) References Cited

U.S. PATENT DOCUMENTS

| | | | |
|---|---|---|---|
| 10,149,546 B2* | 12/2018 | Nakao | B29C 44/1285 |
| 10,166,892 B2* | 1/2019 | Mochizuki | B60N 2/64 |
| 10,414,309 B2* | 9/2019 | Noro | A47C 7/20 |
| 2009/0227913 A1* | 9/2009 | Moriyama | B60N 2/90 |
| | | | 601/49 |
| 2010/0133891 A1* | 6/2010 | Onoda | B60N 2/646 |
| | | | 297/452.48 |
| 2019/0077220 A1* | 3/2019 | Lochmann | B60H 1/2227 |
| 2019/0176668 A1* | 6/2019 | Araki | B60N 2/68 |
| 2019/0217759 A1* | 7/2019 | Sakakibara | A47C 7/20 |

\* cited by examiner

VEHICLE SEAT

CROSS-REFERENCE TO RELATED APPLICATIONS

This application claims priority from Japanese Patent Application No. 2017-235803 filed on Dec. 8, 2017, the entire contents of which are incorporated herein by reference.

TECHNICAL FIELD

The present disclosure relates to a vehicle seat.

BACKGROUND

There has been known a vehicle seat which includes a pad having a two-layer structure as a cushion member. A vehicle seat including a pad in which a back pad is molded integrally to a side opposite to a seating surface of a surface pad is disclosed in JP-A-2010-125138. The back pad is AS resin foam (a copolymer of acrylonitrile and styrene), while the surface pad is foam of polyurethane resin. When viewed from the seating surface side, an outer peripheral edge of a back surface of the back pad is formed with a plurality of recesses. The recesses have a predetermined width and are recessed from the back surface side toward the seating surface side. A cover member covers the pad. Clips provided on an end of a cover member are inserted into the recesses and locked to the recesses. Accordingly, the cover member is kept covering the pad.

In the vehicle seat disclosed in Patent Document 1, it is necessary that parts of the back pad where the recesses are formed have a thickness equal to or larger than a predetermined value since the recesses are disposed in the outer peripheral edge of the back pad in the back surface. However, in order not to inhibit seat comfort due to a shape of the vehicle seat, it may be not possible to adopt the thickness equal to or larger than a predetermined value at the parts of the back pad where the recesses are desirably disposed, or to keep the cover member to the pad without slack.

SUMMARY

The present disclosure is made in view of such consideration. An object of the present disclosure is to provide a vehicle seat including a pad having a two-layer structure as a cushion member, in which a cover member that covers the pad can be attached thereto without slack.

An aspect of the present disclosure is a vehicle seat including: a pad which is a cushion member, the pad including: a surface pad on a side of a seating surface; and a back pad integrated to the surface pad on a side of the surface pad opposite to the seating surface and having a higher rigidity than a rigidity of the surface pad; and a cover member that covers the pad, and a frame-shaped reinforcing member is insert-molded to an outer peripheral edge of the back pad, and at least a part of the reinforcing member, which is a locked portion that locks an end portion of the cover member, is exposed from the back pad toward a direction opposite to the side of the seating surface, and a part in the outer peripheral edge of the back pad other than a part corresponding to the locked portion is formed with a plurality of recesses recessed toward the seating surface, an engagement member attached to the end portion of the cover member being inserted into the plurality of recesses and supported, and the part of the back pad corresponding to the locked portion is thinner than a part of the back pad where the plurality of recesses are formed.

DETAILED DESCRIPTION

Figure 1:
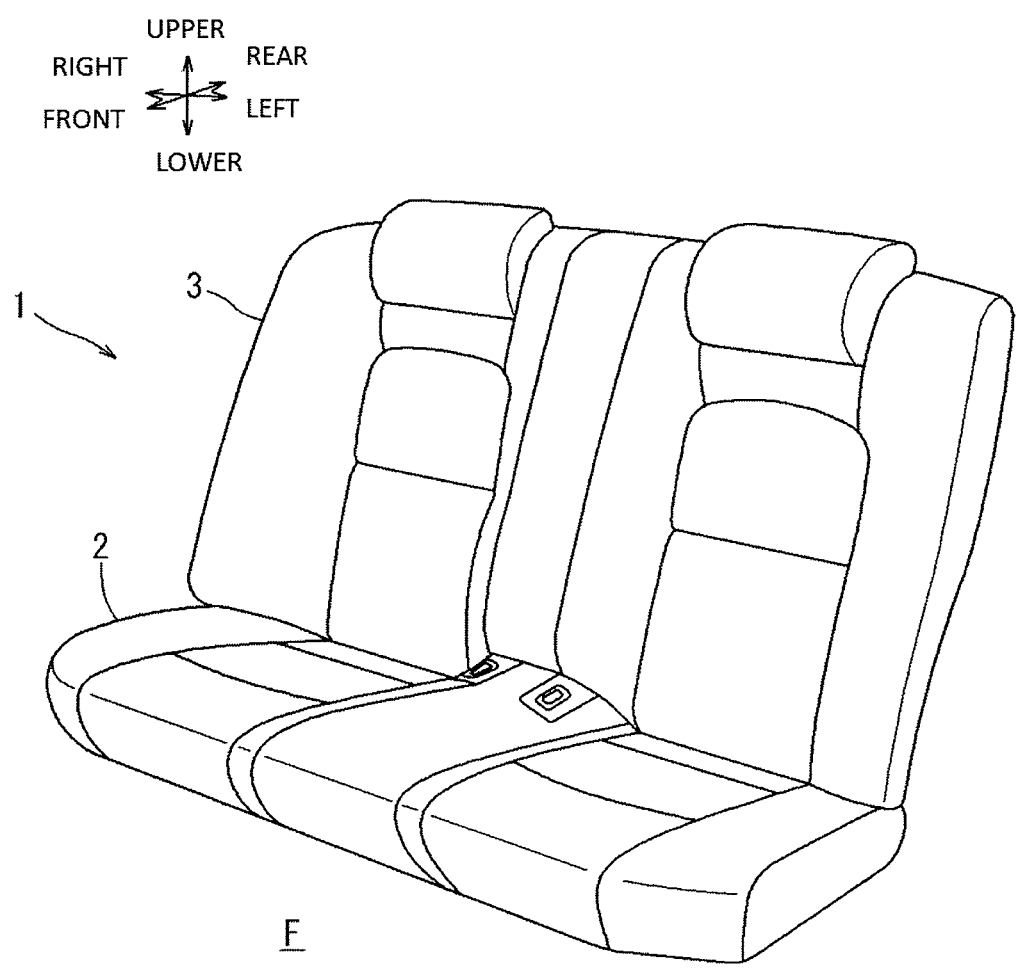
FIG. 1 is a perspective view of an automobile seat according to an embodiment of the present disclosure.

FIGS. 1 to 10 illustrate an automobile seat 1 according to an embodiment of the present disclosure. In the drawings, arrows indicate directions of an automobile and the automobile seat 1 when the automobile seat 1 is attached to a floor F of the automobile. In the following description, descriptions of directions are made based on these directions.

As illustrated in FIG. 1, the automobile seat 1 is a three-person bench seat having substantially the same length as width of the vehicle interior in the left-right direction. The automobile seat 1 includes a seat cushion 2 that supports buttocks and thighs of a seated occupant, and a seat back 3 that supports the back of the seated occupant. The seat cushion 2 and the seat back 3 constitute the automobile seat 1 such that a lower end portion of the seat back 3 abuts against a rear end portion of the seat cushion 2, and that the seat back 3 is attached to the floor F in a state of being erected from the seat cushion 2. The seat back 3 has typically such a structure that a back pad, which is polyurethane resin foam, is covered with a back cover that is a cover member. An upper surface of the seat cushion 2 and a front surface of the seat back 3 are seating surfaces against which the body of a seated occupant abuts. The automobile seat 1 corresponds to a "vehicle seat" in the claims.

Figure 2:
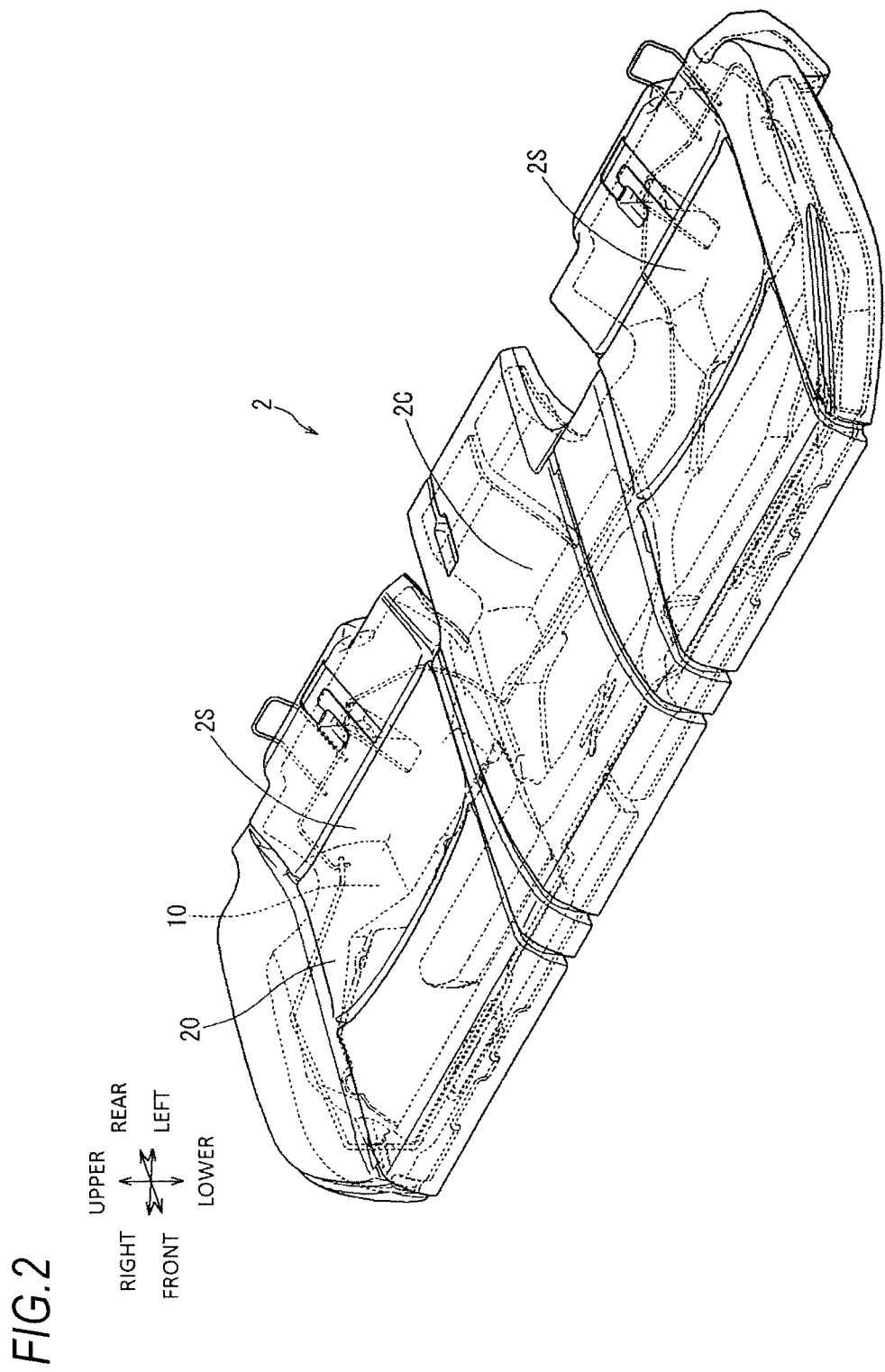
FIG. 2 is a perspective view of a seat cushion according to the embodiment.
Figure 3:
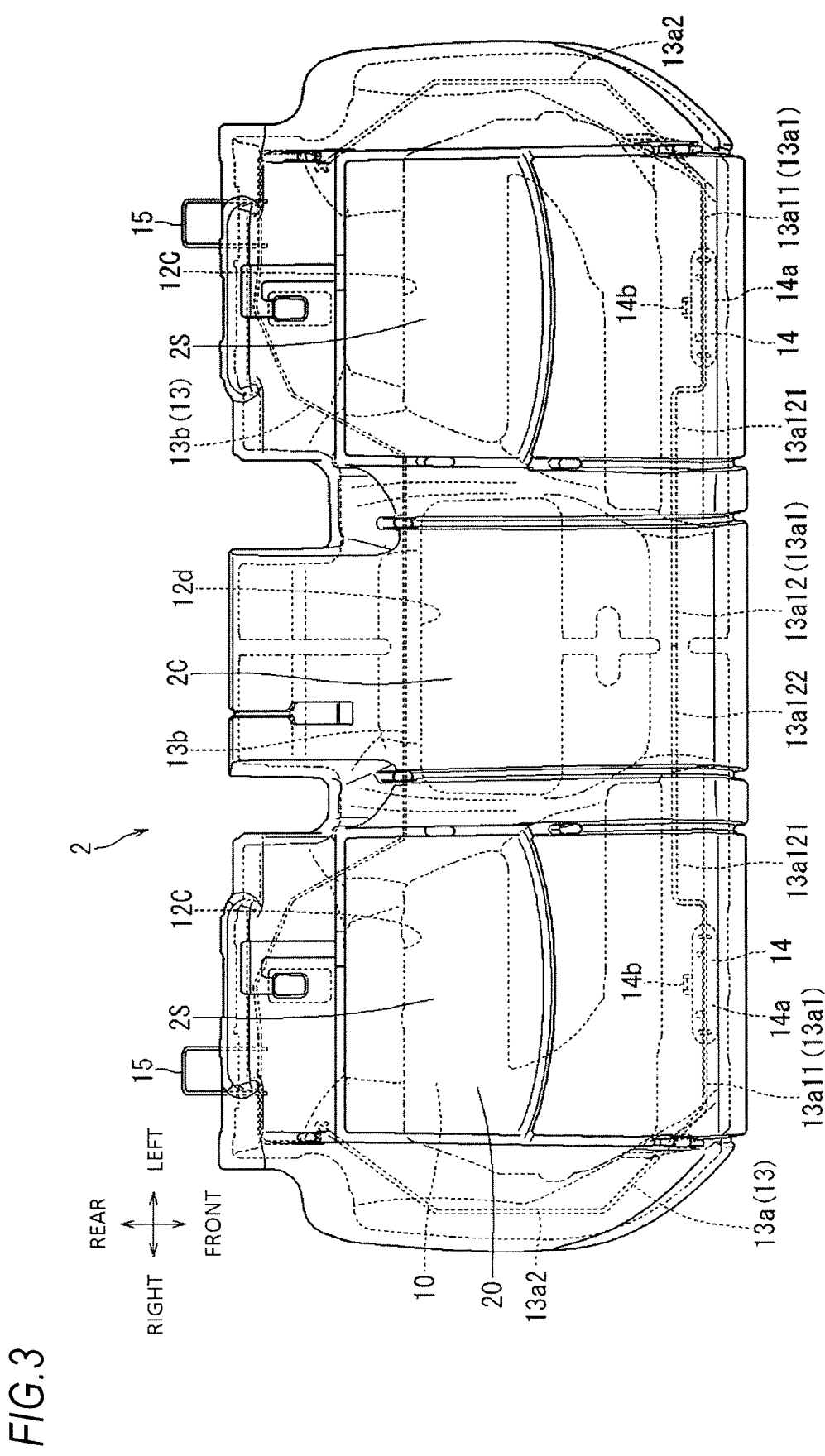
FIG. 3 is a plan view of the seat cushion according to the embodiment.

As illustrated in FIGS. 2 and 3, the seat cushion 2 includes a pair of left and right seats 2S and a middle seat 2C between the left and right seats 2S. The seat cushion 2 includes a cushion pad 10 which is a cushion member and a cushion cover 20 which is a cover member. The cushion cover 20 covers a surface of the cushion pad 10 on the seated occupant side. The cushion pad 10 corresponds to a "pad" in the claims.

Figure 4:
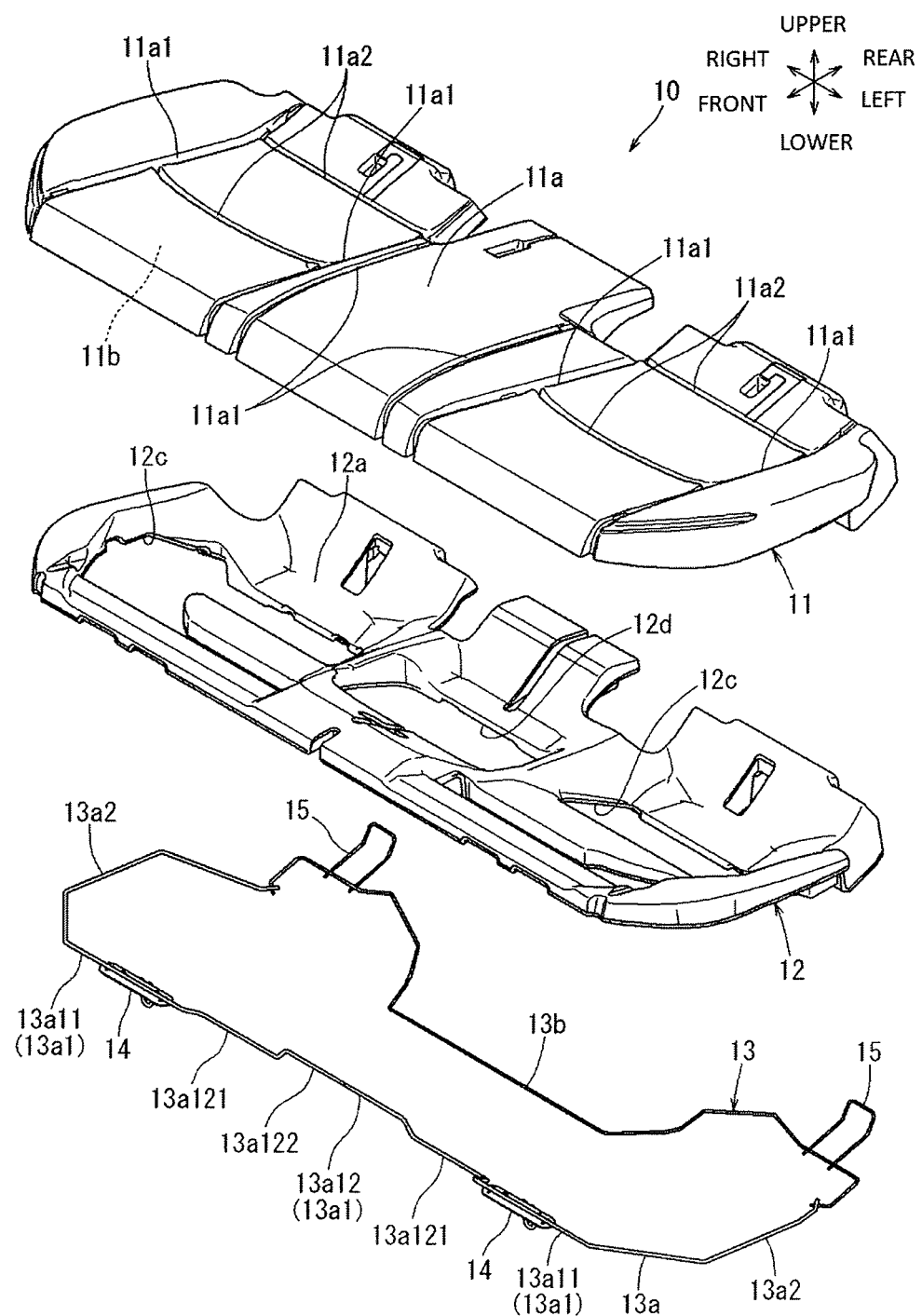
FIG. 4 is an exploded perspective view of a cushion pad of the seat cushion according to the embodiment.
Figure 6:
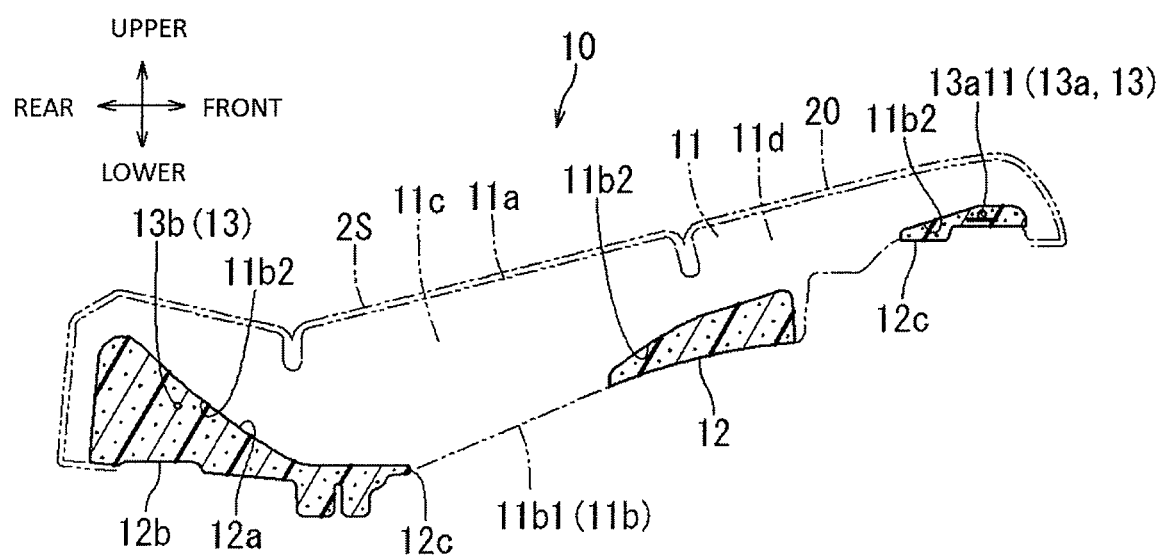
FIG. 6 is a sectional view taken along a line VI-VI in FIG. 5, in which a surface pad and a cover member are illustrated in two-dot chain lines.
Figure 7:
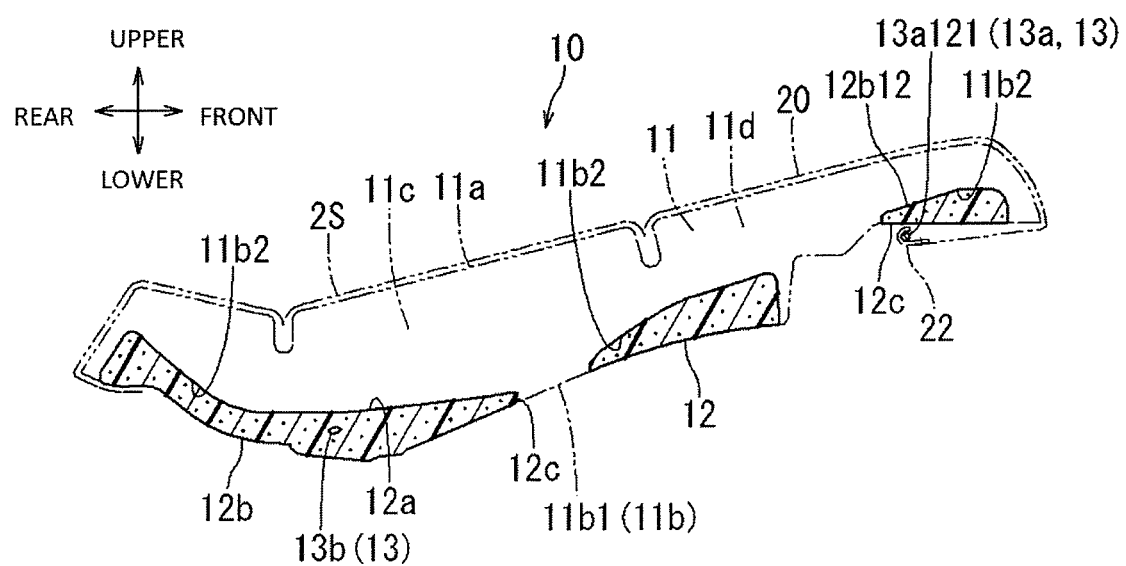
FIG. 7 is a sectional view taken along a line VII-VII in FIG. 5, in which the surface pad and a cushion cover are illustrated in two-dot chain lines.
Figure 8:
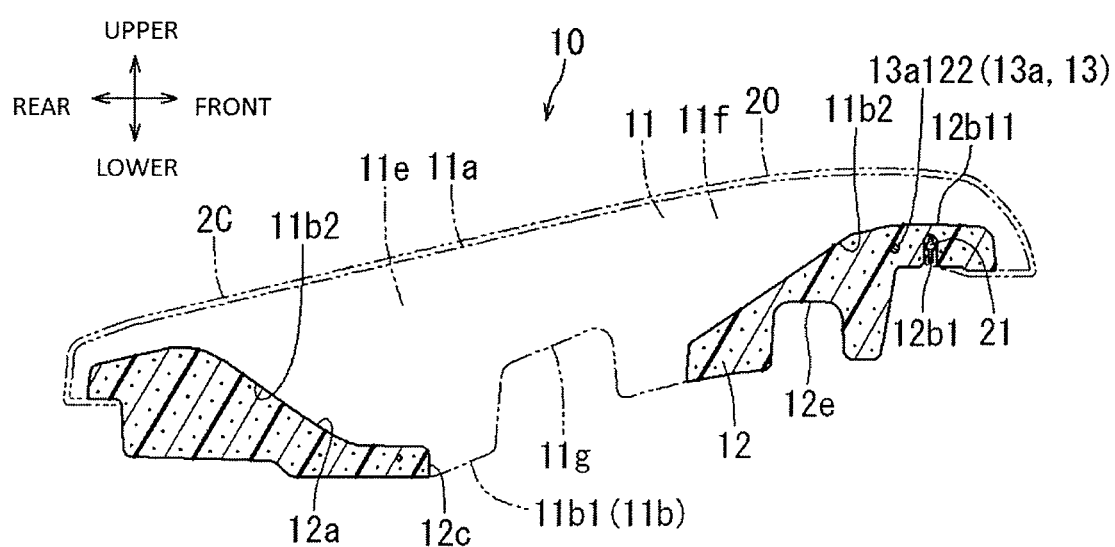
FIG. 8 is a sectional view taken along a line VIII-VIII in FIG. 5, in which the surface pad and the cushion cover are illustrated in two-dot chain lines.

As illustrated in FIGS. 2 to 4, the cushion pad 10 includes a surface pad 11 on a surface side, which is the seated occupant side, of the cushion pad 10, and a back pad 12 on a back side, which is opposite to the seated occupant side, of the surface pad 11. The surface pad 11 is formed of urethane foam obtained by foaming polyurethane resin. A density of the surface pad 11 is, for example, substantially 0.045±0.005 g/cm³. The surface pad 11 includes a surface portion 11a having a shape and an area occupying an entire surface of the cushion pad 10 on the seated occupant side, and a back surface portion 11b which is a surface opposite to the seated occupant side. In the surface pad 11, as illustrated in FIGS. 6 and 7, a buttock support portion 11c, which supports buttocks of a seated occupant in the left and right seats 2S, is thicker than a thigh support portion 11d which supports thighs of the seated occupant in the left and right seats 2S. Therefore, by elastically supporting the body of the seated occupant on the buttock support portion 11c having high seat pressure than on the thigh support portion 11d having low seat pressure, seating becomes more comfortable. In the surface pad 11, as illustrated in FIG. 8, a buttock support portion 11e and a thigh support portion 11f of the middle seat 2C are slightly thicker than the buttock support portion 11c and the thigh support portion 11d of the left and right seats 2S. As illustrated in FIG. 4, the surface portion 11a of the surface pad 11 is formed with a pair of longitudinal grooves 11a1 extending in the front-rear direction on left and right sides of each of the left and right seats 2S, and two horizontal grooves 11a2 connecting the pair of longitudinal grooves 11a1 in both rear ends and substantially middle portions in the front-rear direction. The middle seat 2C is also formed with a pair of longitudinal grooves 11a1 extending in the front-rear direction on left and right sides thereof. The longitudinal grooves 11a1 and the horizontal grooves 11a2 have substantially U-shaped cross sections.

As illustrated in FIGS. 4 to 10, the back pad 12 is a foam molded body of olefin-based resin such as polypropylene resin or polyethylene resin. A density of the back pad 12 is substantially 0.03 g/cm³. The back pad 12 has a density smaller than that of the surface pad 11 and has a high elastic modulus. The volume of the back pad 12 is substantially one third of the total volume of the cushion pad 10.

As illustrated in FIGS. 5 to 10, the back pad 12 includes a surface portion 12a that abuts against a part of the back surface portion 11b of the surface pad 11, and a back portion 12b that forms a surface opposite to the seated occupant side. The back pad 12 has a substantially U-shaped through hole 12c that opens toward the middle of the automobile seat 1 in the width direction, as viewed from above, at a part corresponding to each of the left and right seats 2S. The back pad 12 has a through hole 12d with a substantially rectangular shape in a top view at a substantially middle portion of the middle seat 2C in the front-rear direction. Accordingly, when the surface pad 11 is integrally foamed to the back pad 12, a part of the surface pad 11 enters the through hole 12c and the through hole 12d of the back pad 12, and is molded and cured. In this way, an exposed back surface portion 11b1 is formed as the part of the back surface portion 11b of the surface pad 11. The exposed back surface portion 11b1, together with the back portion 12b of the back pad 12, forms a back side of the cushion pad 10. The surface portion 12a of the back pad 12 is joined to a joining back surface portion 11b2 during integral foam molding of the surface pad 11. The joining back surface portion 11b2 is a part other than the exposed back surface portion 11b1 of the back surface portion 11b of the surface pad 11. As illustrated in FIG. 8, the back surface portion 11b of the surface pad 11 and the back portion 12b of the back pad 12 may have a reduced thickness hole 11g and a reduced thickness hole 12e at predetermined positions as necessary, so as to save materials to be used.

As illustrated in FIGS. 3 to 10, an iron wire frame 13 is inserted inside the outer peripheral edge around the back pad 12. The frame 13 includes a substantially U-shaped main frame 13a opened rearward in a top view, and a rear frame 13b across the opening of the main frame 13a. As illustrated in FIG. 3, the main frame 13a includes a front frame 13a1 extending substantially in the left-right direction along the front outer peripheral edge of the back pad 12, and a pair of left and right frames 13a2 extending substantially in the front-rear direction along the left and right outer peripheral edges of the back pad 12. The frame 13 corresponds to a "reinforcing member" in the claims.

Figure 5:
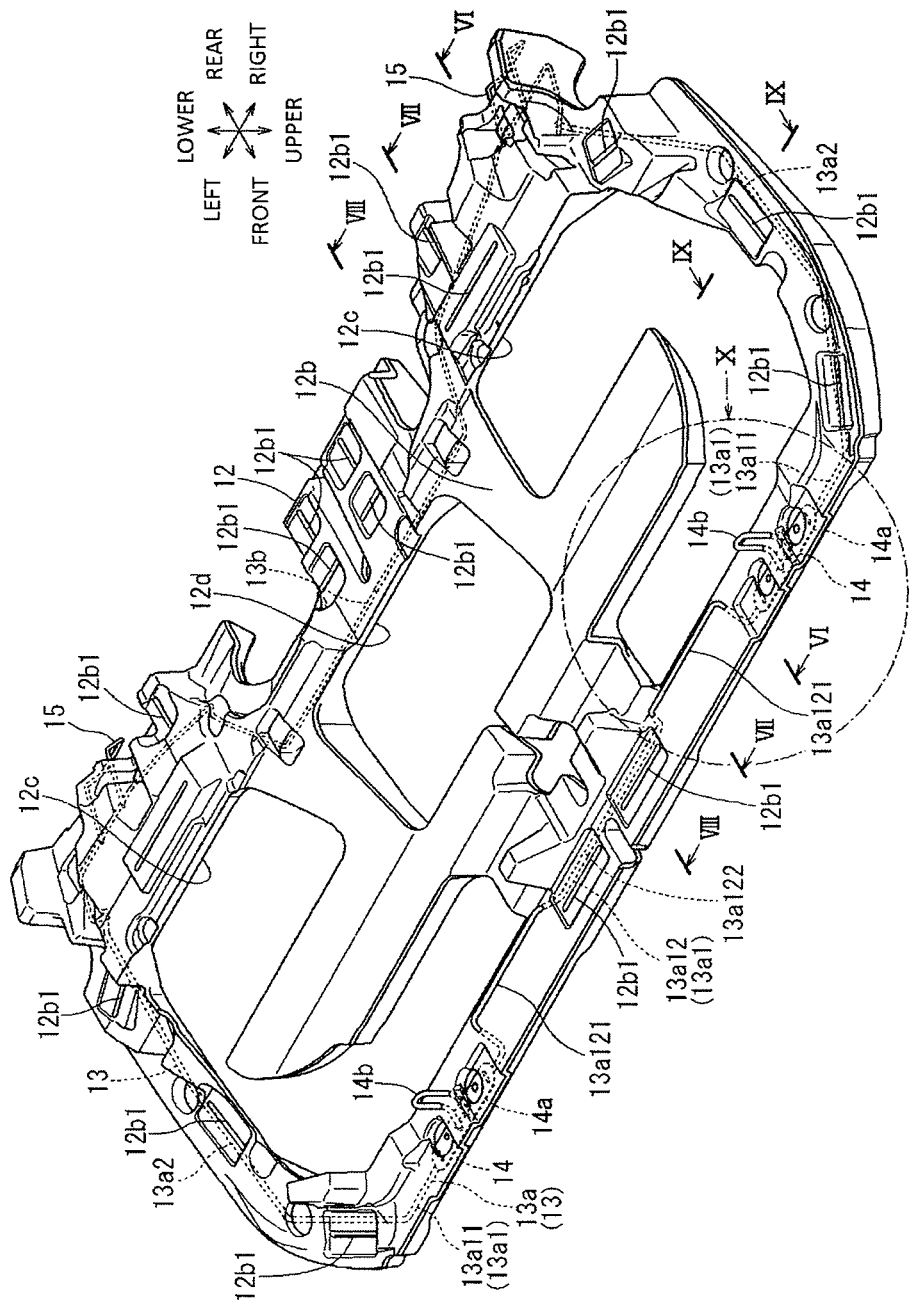
FIG. 5 is a perspective view of a back pad of the seat cushion according to the embodiment as viewed from a back side.

As illustrated in FIGS. 3 to 5, the front frame 13a1 includes a pair of left and right front frames 13a11 extending in the left-right direction at both left and right ends thereof, and a middle front frame 13a12 extending in the left-right direction, in a top view, at a middle in the left-right direction thereof. The middle front frame 13a12 is behind the left and right front frames 13a11. The middle front frame 13a12 is shorter than a length between each of center lines of the pair of left and right seats 2S in the left-right direction. As illustrated in FIGS. 4 and 5, the middle front frame 13a12 includes a pair of lower middle front frames 13a121 on lower sides (opposite side to the seating surface side) of both left and right end portions, and an upper middle front frame 13a122 on an upper side (the seating surface side) of a middle portion in the left-right direction. The pair of lower middle front frames 13a121 and the upper middle front frame 13a122 are smoothly connected. When the frame 13 is insert-molded in the back pad 12, the upper middle front frame 13a122 is disposed in the back pad 12, while the lower middle front frames 13a121 are exposed downward (toward a direction opposite to the seating surface side) from the back portion 12b of the back pad 12. That is, as well illustrated in FIG. 10, the lower middle front frames 13a121 are exposed downward from the back portion 12b of the back pad 12 at positions behind the left and right front frames 13a11. The pair of left and right front frames 13a11 is connected with a front locking frame 14 by welding. The front locking frame 14 is used to lock the cushion pad 10 to the floor F. As illustrated in FIG. 5, the front locking frame 14 includes a plate portion 14a extending in parallel with the back portion 12b, and a wire portion 14b obtained by bending a U-shaped wire connected to the plate portion 14a by welding. The wire portion 14b is inserted into a mounting hole (not illustrated) in the floor F so as to be locked to the floor F. Each of the pair of right and left frames 13a2 is bent outward in the width direction, in a top view, along each of the left and right outer peripheral edges of the back pad 12. Each of the lower middle front frames 13a121 corresponds to the "locked portion" in the claims.

As illustrated in FIGS. 3 to 5, the rear frame 13b has such a shape that, in a top view, left and right end portions thereof extend along the rear outer peripheral edge of the back pad 12, while a middle portion thereof in the left-right direction extends along the rear outer peripheral edge of the through hole 12d in the left-right direction. The left and right end portions of the rear frame 13b are connected to rear end portions of the pair of left and right frames 13a2 by welding. Therefore, the frame 13 is formed in a frame shape in a top view. That is, the frame 13 has the frame shape when the back pad is viewed from a direction perpendicular to the seating surface. When the frame 13 is insert-molded in the back pad 12, a part of the frame 13 excluding the lower middle front frames 13a121 is disposed in the back pad 12. That is, the upper middle front frame 13a122, the left and right front frames 13a11, the left and right frames 13a2, and the rear frame 13b are disposed in the back pad 12. The left and right end portions of the rear frame 13b are connected respectively with a rear locking frame 15 by welding. The rear locking frame 15 is used to lock the seat back 3. The rear locking frame 15 is obtained by bending a U-shaped wire. The frame 13 is insert-molded in the back pad 12 by, when bead foam molding the back pad 12, disposing the frame 13 at a predetermined position of the mold and integrally foam molding the back pad 12.

Figure 9:
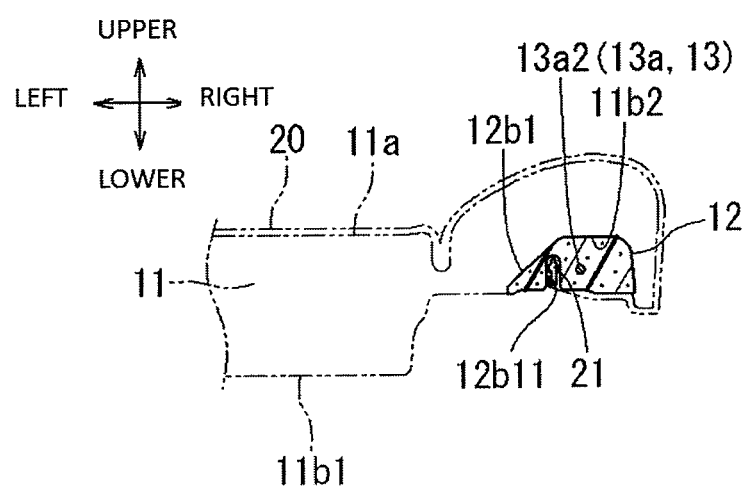
FIG. 9 is a sectional view taken along a line IX-IX in FIG. 5, in which the surface pad and the cushion cover are illustrated in two-dot chain lines.
Figure 10:
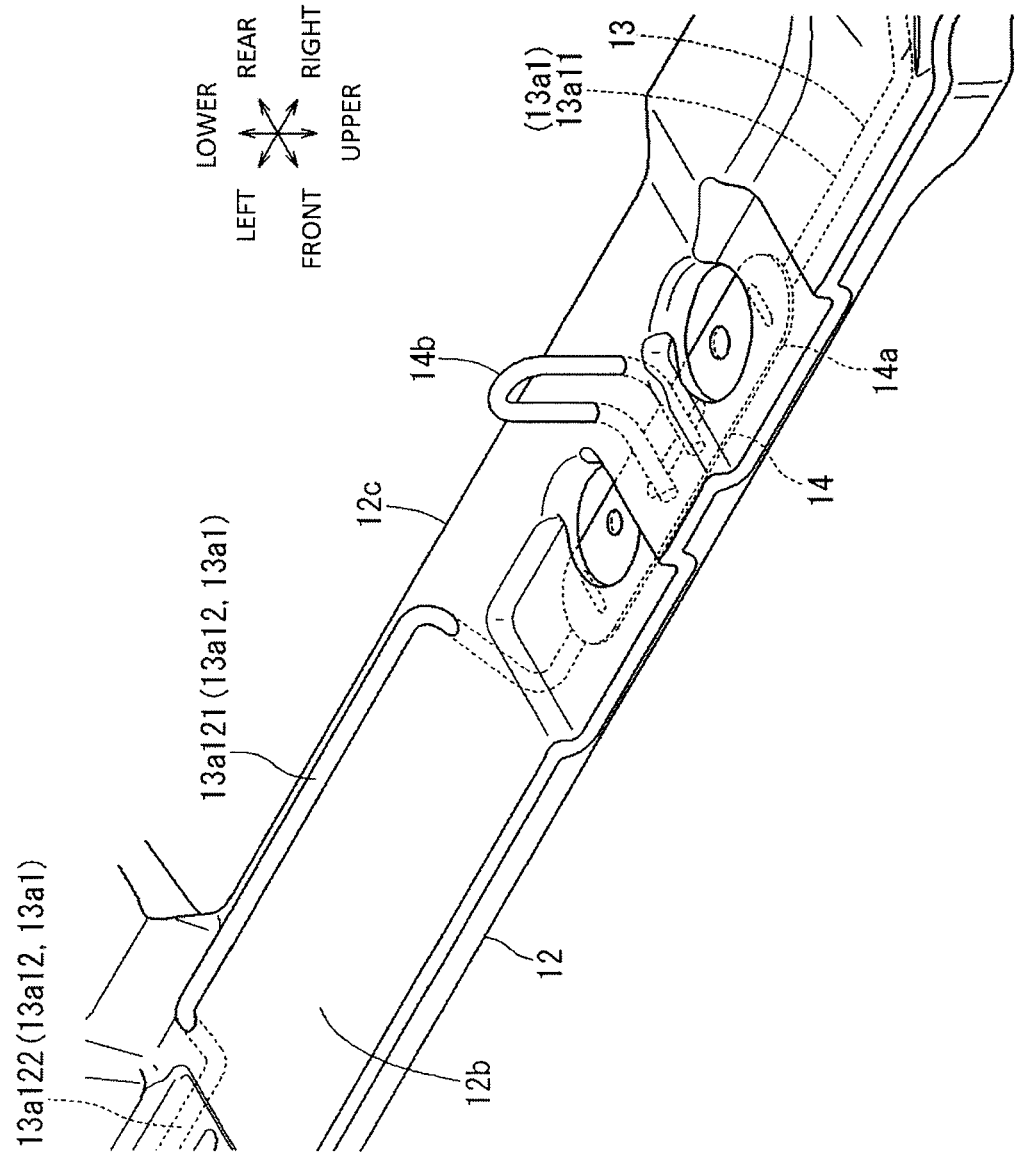
FIG. 10 is an enlarged view of a part X in FIG. 5.

As illustrated in FIG. 5, the back portion 12b of the back pad 12 has a plurality of recesses 12b1 on the outer peripheral edge thereof. Since each of the plurality of recesses 12b1 has the same cross section but different lengths extending in parallel to the back portion 12b, a recess 12b1 on a right end portion of the back portion 12b in FIG. 9 is described as a representative. As illustrated in FIG. 9, the recess 12b1 is a groove extending in the front-rear direction in an inverted U-shape with a cross section open downward. The recess 12b1 is disposed on a left side (inner side of the automobile seat 1 in the width direction) of the left and right frames 13a2. A clip 21 attached to an end of the cushion cover 20 is inserted into the recess 12b1 and engaged with the recess 12b1, so that the cushion cover 20 is attached to the cushion pad 10. The other recesses 12b1 are substantially the same as the above-described recess 12b1. A recess forming portion 12b11 of the back pad 12, which is a part where the recess 12b1 of the back pad 12 is formed, has a thickness equal to or greater than the depth of the recess 12b1 in the up-down direction. The clip 21 corresponds to an "engagement member" in the claims. The recess forming portion 12b11 corresponds to a "part of the back pad where the plurality of recesses are formed" in the claims.

A process of covering the cushion cover 20 to the cushion pad 10 and attaching the end of the cushion cover 20 to the outer peripheral edge of the back portion 12b of the back pad 12 is described. As illustrated in FIGS. 8 and 9, when the cushion cover 20 is covered on the cushion pad 10, the clip 21 attached to the end of the cushion cover 20 is inserted into each of the recesses 12b1 of the back pad 12 and locked to each of the recesses 12b1 of the back pad 12. The clip 21 is made of resin, and a tip end thereof has an arrowhead shape. When inserted into each of the recesses 12b1, the clip 21 is locked to a wall surface of each of the recesses 12b1 to be prevented from coming off. As illustrated in FIG. 7, a hook 22 having a J-shaped cross section attached to the end of the cushion cover 20 is locked to the lower middle front frames 13a121 of the frame 13 exposed from the back portion 12b of the back pad 12. Accordingly, the entire area of the end of the cushion cover 20 is held to the outer peripheral edge of the back portion 12b of the back pad 12, so that the cushion cover 20 is attached to the cushion pad 10 without slack. An exposed frame forming portion 12b12 of the back pad 12, which is a part corresponding to the lower middle front frames 13a121 of the back pad 12, is thinner than the recess forming portion 12b11 in the up-down direction and the recess 12b1 cannot be formed. The exposed frame forming portion 12b12 corresponds to a "part of the back pad corresponding to the locked portion" in the claims, which is a part of the back pad 12 from which the lower middle front frame 13a121 is exposed. The part in the outer peripheral edge of the back pad 12 other than the exposed frame forming portion 12b12 corresponds to a "part in the outer peripheral edge of the back pad other than the part corresponding to the locked portion" in the claims, which is a part in the outer peripheral edge of the back pad 12 in which the frame 13 is disposed. The hook 22 corresponds to an "engagement member" in the claims.

The embodiment configured as described above has the following advantages. When the end of the cushion cover 20 is attached and locked to the outer peripheral edge of the back portion 12b of the back pad 12, the end of the cushion cover 20 can be locked by the lower middle front frames 13a121 even if there is a thin part (i.e. the exposed frame forming portion 12b12) that cannot form the recess 12b1. That is, the cushion cover 20 can be attached to the cushion pad 10 without slack by disposing the lower middle front frames 13a121 below the exposed frame forming portion 12b12 (a direction opposite to the seating surface) and locking the hook 22, which is attached to the end of the cushion cover 20, to the lower middle front frames 13a121. Since the frame 13 is formed of a wire which is a linear member made of metal, the lower middle front frames 13a121 is formed simply by bending a part of the frame. Attachment workability is good since the end of the cushion cover 20 is attached simply by locking the hook 22 to the lower middle front frames 13a121. Further, the surface pad 11 can support the seated occupants with high elasticity and the back pad 12 can reduce the weight of the cushion pad 10 since the surface pad 11 is made of urethane foam resin and the back pad 12 is made of olefin-based bead foam resin. That is, it is possible to provide the automobile seat 1 with good seat comfort.

While the specific embodiment has been described above, the present disclosure is not limited to configurations in the embodiment, and modifications, additions and deletions are possible without changing the spirit of the present disclosure. For example, the following matters are listed.

In the above embodiment, the present disclosure is applied to the seat cushion 2 of the automobile seat 1. However, it may also be applied such that the back pad of the seat back 3 has a two-layer structure of a surface pad and a back pad. The present disclosure may also be applied to a vehicle seat mounted on an airplane, a ship, a train, or the like.

2. In the above embodiment, the back pad 12 is made of olefin-based bead foam resin such as polypropylene or polyethylene. However, the present disclosure is not limited thereto. The back pad 12 may also be made of bead foam resin of composite resin of styrene-based resin, styrene-based resin, and olefin-based resin.

3. In the above embodiment, the back pad 12 includes two lower middle front frames 13a121 which are locked portions to lock the end of the cushion cover 20. However, the present disclosure is not limited thereto. The number of the locked portion corresponding to the lower middle front frames 13a121 may be one or three or more.

The disclosure provides illustrative, non-limiting examples as follows:

A first aspect of the present disclosure is a vehicle seat including: a pad which is a cushion member, the pad including: a surface pad on a side of a seating surface; and a back pad integrated to the surface pad on a side of the surface pad opposite to the seating surface and having a higher rigidity than a rigidity of the surface pad; and a cover member that covers the pad, and a frame-shaped reinforcing member is insert-molded to an outer peripheral edge of the back pad, and at least a part of the reinforcing member, which is a locked portion that locks an end portion of the cover member, is exposed from the back pad toward a direction opposite to the side of the seating surface, and a part in the outer peripheral edge of the back pad other than a part corresponding to the locked portion is formed with a plurality of recesses recessed toward the seating surface, an engagement member attached to the end portion of the cover member being inserted into the plurality of recesses and supported, and the part of the back pad corresponding to the locked portion is thinner than a part of the back pad where the plurality of recesses are formed.

According to the first aspect, when the end portion of the cover member is attached and locked to the side of the back pad opposite to the side of the seating surface, the end portion of the cover member can be locked by exposing the part of the reinforcing member from the back pad, which is the locked portion, in despite of the part having a small thickness at the outer peripheral edge of the back pad. That is, in despite of the part having a small thickness where a recess, to which the engagement member attached to the end portion of the cover member is inserted, cannot be formed on the outer peripheral edge of the back pad, the part of the reinforcing member, which is the locked portion, can be locked to the cover member, and the cover member can be attached to the pad without slack.

A second aspect of the present disclosure is characterized in that in the first aspect, the part of the back pad corresponding to the locked portion is a part of the back pad from which the locked portion is exposed, and the part in the outer peripheral edge of the back pad other than the part corresponding to the locked portion is a part of the back pad in which the reinforcing member is disposed A third aspect of the present disclosure is characterized in that in the first aspect, the reinforcing member is formed of a linear member made of metal.

According to the third aspect, the locked portion can be formed by partially bending the linear member, and effects of the first aspect can be achieved with a simple structure.

A fourth aspect of the present disclosure is characterized in that in the first aspect, the end portion of the cover member is attached to the locked portion via a hook-like locking member attached to the end portion of the cover member.

According to the fourth aspect, attachment workability is good since the end portion of the cover member is just attached to the locked portion via the hook-like locking member.

A fifth aspect of the present disclosure is characterized in that in the first aspect, the surface pad is made of urethane foamed resin, and the back pad is made of bead foam resin.

According to the fifth aspect, the surface pad can support a seated occupant with high elasticity, and the back pad can reduce the weight of the pad. That is, it is possible to provide the vehicle seat with good seat comfort.

What is claimed is:

1. A vehicle seat comprising:
   a pad which is a cushion member, the pad including:
      a surface pad on a side of a seating surface; and
      a back pad integrated to the surface pad on a side of the surface pad opposite to the seating surface and having a higher rigidity than a rigidity of the surface pad; and
   a cover member that covers the pad,
   wherein a frame-shaped reinforcing member is insert-molded to an outer peripheral edge of the back pad,
   wherein at least a part of the reinforcing member, which is a locked portion that locks an end portion of the cover member, is exposed from the back pad toward a direction opposite to the side of the seating surface,
   wherein a part in the outer peripheral edge of the back pad other than a part corresponding to the locked portion is formed with a plurality of recesses recessed toward the seating surface, an engagement member attached to the end portion of the cover member being inserted into the plurality of recesses and supported, and
   wherein the part of the back pad corresponding to the locked portion is thinner than a part of the back pad where the plurality of recesses are formed.

2. The vehicle seat according to claim 1,
   wherein the part of the back pad corresponding to the locked portion is a part of the back pad from which the locked portion is exposed, and
   wherein the part in the outer peripheral edge of the back pad other than the part corresponding to the locked portion is a part of the back pad in which the reinforcing member is disposed.

3. The vehicle seat according to claim 1,
   wherein the reinforcing member is formed of a linear member made of metal.

4. The vehicle seat according to claim 1,
   wherein the end portion of the cover member is attached to the locked portion via a hook-shaped locking member attached to the end portion of the cover member.

5. The vehicle seat according to claim 1,
   wherein the surface pad is made of urethane foamed resin, and the back pad is made of bead foam resin.

* * * * *